United States Patent
Endo et al.

(10) Patent No.: US 8,830,324 B2
(45) Date of Patent: Sep. 9, 2014

(54) VEHICLE MONITORING CAMERA AND VEHICLE MONITORING CAMERA SYSTEM

(75) Inventors: Osamu Endo, Shizuoka (JP); Naoki Tatara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 695 days.

(21) Appl. No.: 12/763,243

(22) Filed: Apr. 20, 2010

(65) Prior Publication Data

US 2010/0277935 A1  Nov. 4, 2010

(30) Foreign Application Priority Data

Apr. 30, 2009  (JP) .................................. 2009-110450

(51) Int. Cl.
| | | |
|---|---|---|
| H04N 7/18 | (2006.01) | |
| G08G 1/04 | (2006.01) | |
| B60Q 1/14 | (2006.01) | |
| B60Q 1/30 | (2006.01) | |
| B60Q 1/46 | (2006.01) | |
| B60Q 1/00 | (2006.01) | |
| B60Q 1/52 | (2006.01) | |

(52) U.S. Cl.
CPC .............. B60Q 1/0023 (2013.01); G08G 1/04 (2013.01); B60Q 1/1423 (2013.01); B60R 2300/40 (2013.01); B60Q 1/30 (2013.01); B60Q 1/46 (2013.01); B60Q 1/525 (2013.01)
USPC ........................................................ 348/149

(58) Field of Classification Search
CPC ......................................................... G08G 1/04
USPC ........... 382/154, 107; 348/148, 335, 340, 149
See application file for complete search history.

(56) References Cited

U.S. PATENT DOCUMENTS

| | | | | |
|---|---|---|---|---|
| 5,172,235 A | * | 12/1992 | Wilm et al. .................... | 348/343 |
| 6,509,832 B1 | * | 1/2003 | Bauer et al. ................ | 340/425.5 |
| 6,587,573 B1 | * | 7/2003 | Stam et al. .................... | 382/104 |
| 6,958,683 B2 | * | 10/2005 | Mills et al. .................... | 340/436 |
| 2008/0130954 A1 | * | 6/2008 | Taniguchi et al. ............ | 382/104 |
| 2010/0194889 A1 | * | 8/2010 | Arndt et al. .................... | 348/148 |

FOREIGN PATENT DOCUMENTS

JP  2007-13549  1/2007

* cited by examiner

*Primary Examiner* — Geepy Pe
*Assistant Examiner* — James Pontius
(74) *Attorney, Agent, or Firm* — Fish & Richardson P.C.

(57) ABSTRACT

A monitoring camera for a vehicle acquires images of a distant area, a vicinity area and a near area in front or rear of the vehicle. The monitoring camera can include an imaging element and an image forming lens comprising multiple lenses each having a different focal length. Each image of an object passing through a different one of the lenses is formed on a corresponding different region of an imaging surface of the imaging element.

10 Claims, 9 Drawing Sheets

VEHICLE MONITORING CAMERA AND VEHICLE MONITORING CAMERA SYSTEM

This application claims priority from Japanese Patent Application No. 2009-110450, filed on Apr. 30, 2009, the entire contents of which are incorporated herein by reference.

BACKGROUND

1. Technical Field

The present disclosure relates to a monitoring camera which detects an object such as another vehicle or an obstacle in the vicinity of a vehicle, and a vehicle monitoring camera system which is capable of controlling a light distribution of a lamp or a vehicle traveling safety assistant based on the detected object.

2. Related Art

Recently, a technology has been proposed that obtains an image of a peripheral area of a subject vehicle using a monitoring camera, detects an object such as another vehicle or an obstacle in the vicinity of the subject vehicle, and displays the object on a monitoring device or controls a light intensity or a light distribution of a vehicle lamp such as a head lamp or a rear lamp in accordance with the detected objects. In this kind of monitoring camera, it is desirable to monitor a wide range in the vicinity of the vehicle, but it is necessary to mount multiple monitoring cameras each of which obtains images of different respective areas about the vehicle. One problem is that the manufacturing cost of such a monitoring camera is relatively high. For this reason, there has been proposed a monitoring camera capable of monitoring multiple areas using one monitoring camera. For example, JP-A-2007-13549 proposes a monitoring camera that simultaneously obtains images of three areas (i.e., a left area, a right area, and a down area) in the vicinity of the vehicle by using one imaging element. The monitoring camera is located in a rear portion of the vehicle, and an imaging lens and an imaging element are provided in the monitoring camera so as to obtain images of objects. Also, a mirror is provided in the monitoring camera so as to divide an imaging area by three reflection surfaces of the mirror. The three reflection surfaces of the mirror have reflection optical axes respectively facing a left direction, a right direction, and a downward direction.

In the monitoring camera described in JP-A-2007-13549, it is possible to obtain images of three areas using one imaging element. However, since an image of each area is formed on the imaging element using one imaging lens, the imaging magnification of each area is the same (i.e., the close object appears large, and the distant object appears small). Thus, when the images of the objects are displayed on the monitoring device, it is difficult to recognize the distant object (which appears too small). In addition, when the object is image-recognized based on an imaging signal of the object, since the distant object appears small, the resolution of the imaging element is low. Hence, in some cases, the distant object may not be detected through the image recognition. As a result, it often is not possible to monitor the distant area sufficiently, and thus it is not possible to exhibit a function of the monitoring camera sufficiently.

On the other hand, when an imaging lens having a long focal length is used, it is possible to obtain an image of the distant object so that it appears large, and also to increase the resolution of the imaging element. Accordingly, it is possible to recognize or detect the distant object. However, in this case, since the imaging viewing angle is narrow, an object at the side of the monitoring camera and particularly an object close to the monitoring camera are not included in the image viewing angle. Accordingly, it is hard to detect the objects through an imaging operation. For this reason, in the system in which the lighting operation of the vehicle is controlled by detecting the objects, illumination light emitted from the vehicle may result in glare to the adjacent vehicle, and hence the possibility of causing a critical accident may increase.

SUMMARY

Exemplary embodiments of the present invention address the above problems, as well as other problems not described above. However, the present invention is not required to overcome the problems described above, and thus some embodiments of the present invention may not overcome any of the problems described above.

In some implementations of the invention, a vehicle monitoring camera is capable of obtaining images of objects in a vicinity area or a near area at a wide range while obtaining images of objects in a distant area at a large size by using a single camera.

In some implementations of the invention, e a vehicle monitoring camera system is capable of controlling a lighting operation of a vehicle lamp or a vehicle traveling safety assistant based on objects detected from an image acquired by a monitoring camera.

According to one or more aspects of the present invention, a monitoring camera for a vehicle obtains images of a distant area, a vicinity area and a near area in front of or behind the vehicle. The monitoring camera includes an imaging element and an image forming lens. The lens comprises a plurality of lenses each having a different focal length. Each image of the objects passing through a corresponding one of the lenses is formed on a different region of an imaging surface of the imaging element.

According to one or more aspects of the present invention, the image forming lens includes a first lens having a first focal length that obtains images of the distant area in front of or behind the vehicle, and a second lens having a second focal length that obtains images of the vicinity area or the near area in front of or behind the vehicle. The second focal length is shorter than the first focal length.

According to one or more aspects of the present invention, a monitoring camera system includes a monitoring camera, a detecting unit that detects objects in front of or behind the vehicle based on images obtained by the monitoring camera, and a lighting control unit that controls a lighting state of a vehicle lamp based on the detected objects.

Even in the case of one imaging device including one imaging element, an image of the distant object is captured by the lens having a long focal length so that an image of the object is obtained at a large magnification, whereas images of the vicinity or near area can be obtained at a wide range by using a lens having a short focal length. Accordingly, it is possible to obtain an image of the distant object at a high resolution as well as to detect the object reliably. In addition, it is possible reliably to detect an object in the vicinity or near area and thus to provide a monitoring camera which can reliably detect an object such as another vehicle in the vicinity of the vehicle.

As it is possible reliably to detect an object such as another vehicle in the vicinity of the vehicle using the monitoring camera, it is possible to control the lighting state of the rear lamp or the head lamp of the vehicle based on the detection. Accordingly, it is possible to improve the visibility of the vehicle with respect to another vehicle or to prevent (or reduce) glare to another vehicle. It also is possible to control a vehicle traveling safety assistant such as a speed control operation or a steering operation in a traveling mode of the vehicle based on the detection. Accordingly, it is possible to achieve control such that safer traveling state is ensured.

Other aspects and advantages of the present invention will be apparent from the following description, the drawings and the claims.

DETAILED DESCRIPTION OF EXEMPLARY EMBODIMENTS

First Embodiment

Figure 1:
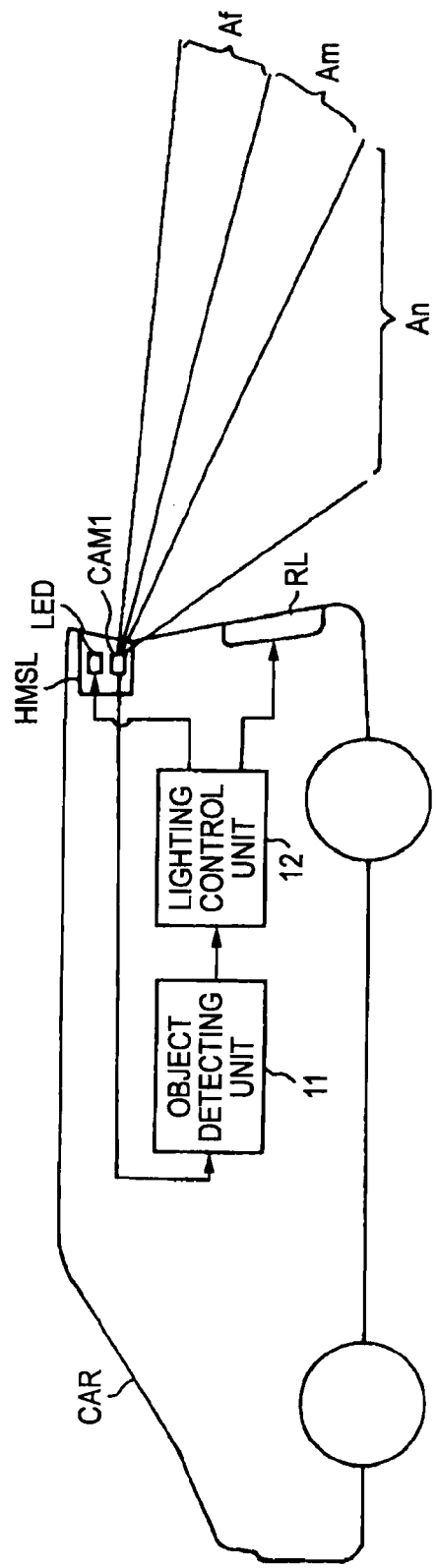
FIG. 1 is a schematic view of a monitoring camera according to a first embodiment of the invention.

An exemplary embodiment of the invention is described with reference to the drawings. FIG. 1 is a schematic view of a monitoring camera system 1 according to a first embodiment in which a monitoring camera is assembled to a high mount stop lamp disposed in a rear, upper edge portion of a vehicle body. A high mount stop lamp HMSL with an LED (Light Emitting Diode) is provided as a light source and is disposed in the rear, upper edge portion of the body of a vehicle CAR. An imaging device CAM1 serves as the monitoring camera and is located in the high mount stop lamp HMSL. The imaging device CAM1 is configured simultaneously to obtain an image of a near area (An), which includes a rear portion and a side portion of the vehicle CAR, and a vicinity area (Am), which is a slight distance from the rear portion of the vehicle CAR and includes a side portion thereof, and a distant area (Af), which is distant from the rear portion of the vehicle CAR. The imaging device CAM1 includes an object detecting unit 11, which detects an object such as another vehicle or an obstacle from an image acquired by the imaging device CAM1. The imaging device CAM1 also includes a lighting control unit 12, which controls a lighting operation of the high mount stop lamp HMSL of the vehicle CAR or a rear lamp RL disposed in the rear portion of the body of the vehicle CAR based on the object detected by the object detecting unit 11. Thus, the imaging device CAM1, the object detecting unit 11, and the lighting control unit 12 constitute the monitoring camera system. The lighting control unit 12 is connected to a lamp switch operated by a driver or a brake pedal switch operated by a driver.

Figure 2A:
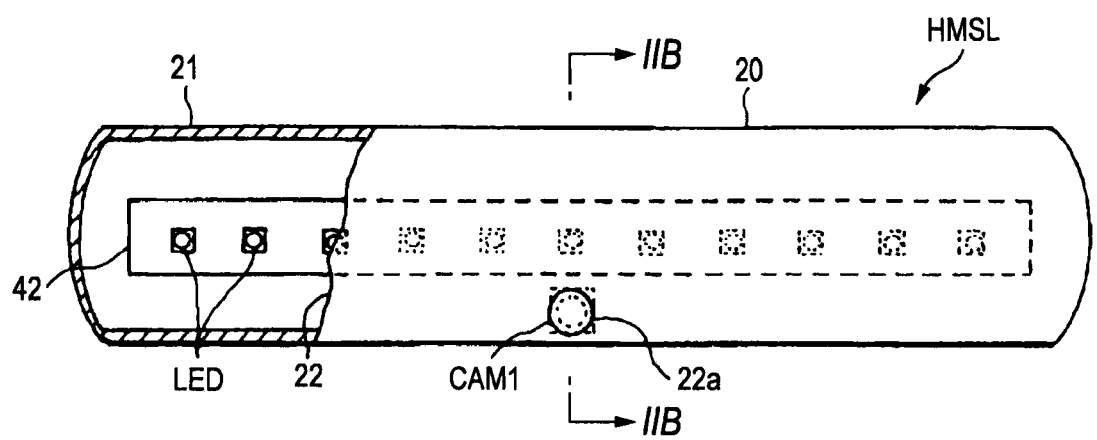
FIG. 2A is a partial cut-away front view of a high mount stop lamp equipped with a monitoring camera (imaging device) according to the first embodiment.
Figure 2B:
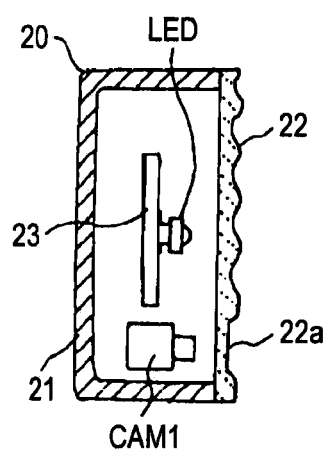
FIG. 2B is a sectional view of the high mount stop lamp taken along the line IIB-IIB of FIG. 2A.

FIGS. 2A and 2B are schematic views of the high mount stop lamp HMSL. FIG. 2A is a partial cut-away front view, and FIG. 2B is an enlarged sectional view taken along the line IIB-IIB of FIG. 2A. In the high mount stop lamp HMSL, the housing 20 includes a lamp body 21, which is provided along the upper edge of the rear portion of the vehicle CAR and whose shape is thin and long in the transverse direction, and a transparent or white front surface lens 22 on which lens steps are integrally formed. A substrate 23, which is thin and long in the transverse direction, is provided in the housing 20, and multiple red LEDs (Light Emitting Diodes) are mounted onto the front surface of the substrate 23 and are arranged in a line in the transverse direction. The LEDs (Light Emitting Diodes) are connected to the lighting control unit 12 shown in FIG. 1. When the brake pedal switch is turned on, current is supplied from the lighting control unit 12 to the LEDs, and the LEDs emit red light so as to illuminate the rear area of the vehicle CAR through the front surface lens 22. An opening window 22a is provided in an area lower than the LEDs (Light Emitting Diodes) of the front surface lens 22 and a substantially center position in the transverse direction. The imaging device CAM1 as the monitoring camera is located in the housing 20 so as to face the opening window 22a.

Figure 3A:
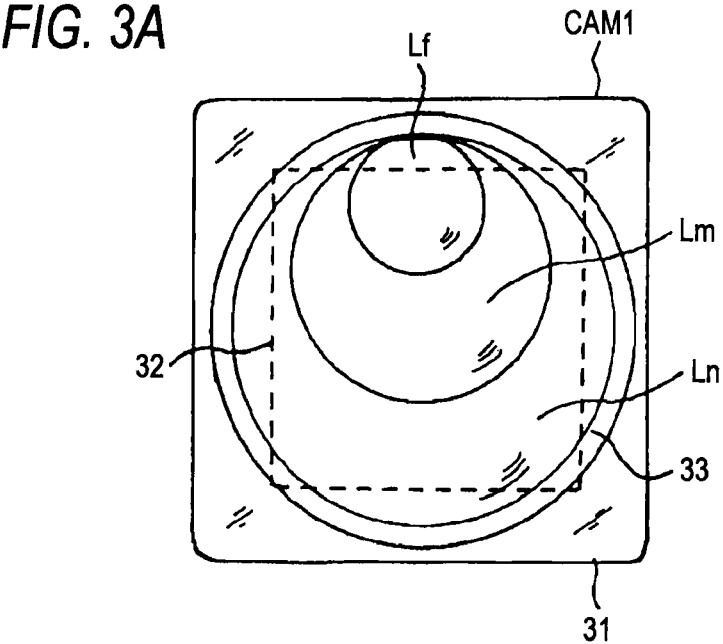
FIG. 3A is a front view of the monitoring camera according to the first embodiment.
Figure 3B:
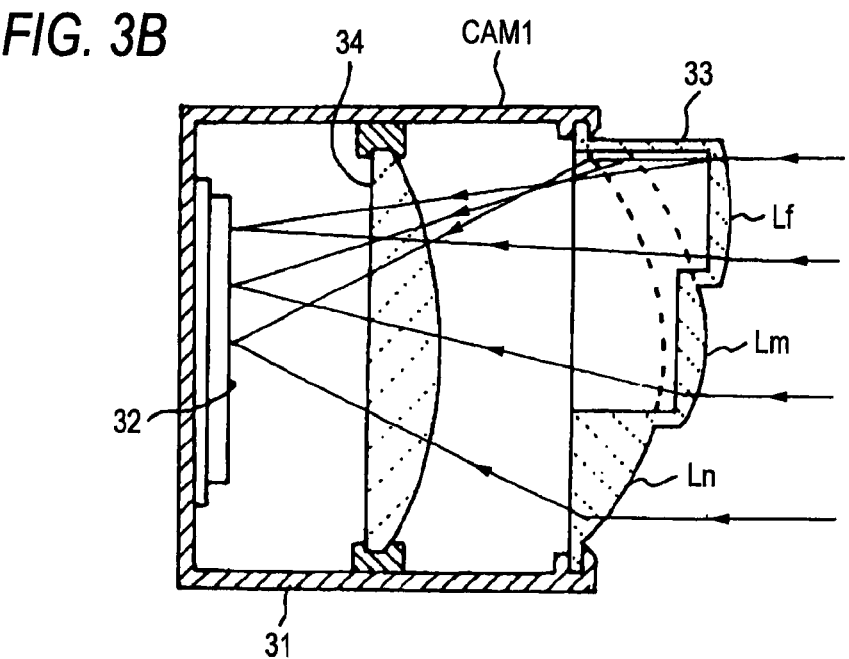
FIG. 3B is a vertical sectional view of the monitoring camera according to the first embodiment.

FIGS. 3A and 3B are schematic views of the imaging device CAM1. FIG. 3A is a front view, and FIG. 3B is a vertical sectional view. Inside a camera body 31 formed in a rectangular container shape, the imaging device CAM1 includes: an imaging element 32 (such as a CCD or a CMOS); a multi image forming lens 33, which optically forms an image of an object on an imaging surface of the imaging element 32; and a focal lens 34, which is located between the multi image forming lens 33 and the imaging element 32. The front shape of the multi image forming lens 33 is formed as one rectangular lens in accordance with the shape of the camera body 31. The multi image forming lens 33 includes: a circular distant area lens Lf, which is disposed at a position closer to the upper side than the center position; a vicinity area lens Lm, which has a circular area having a diameter larger than that of the distant area lens Lf so as to surround the distant area lens Lf; and a near area lens Ln, which surrounds the vicinity area lens Lm. In addition, the distant area lens Lf is formed in a spherical surface having the largest curvature radius, the near area lens Ln is formed in a spherical surface having the smallest curvature radius, and the vicinity area lens Lm is formed in a spherical surface having a curvature radius between the lenses Lf and Ln. Thus, the distant area lens Lf is formed as a long focal lens, the vicinity area lens Lm is formed as a middle focal lens, and the near area lens Ln is formed as a short focal lens. In addition, the distant area lens Lf is located at a forward position farthest from the imaging element 32, the near area lens Ln is located at a rear position closest to the imaging element 32, and the vicinity area lens Lm is located therebetween. The focal lens 34 is provided so as to allow the objects which pass through the distant area lens Lf, the vicinity area lens Lm, and the near area lens Ln, to be focused on the focal surface of the imaging element 32.

Figure 4A:
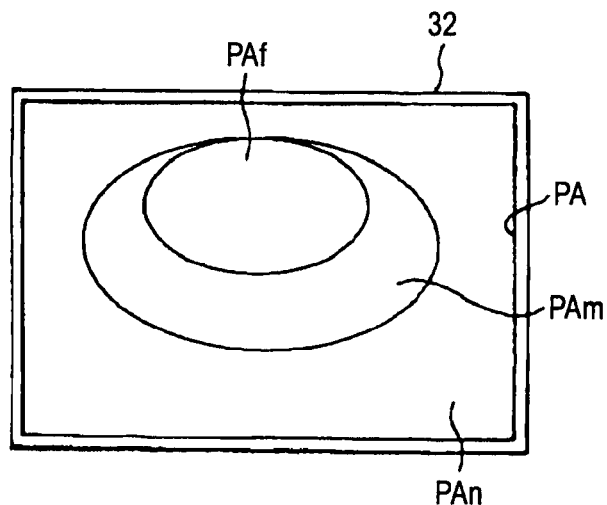
FIG. 4A is a conceptual diagram of an imaging area of the monitoring camera.

In the imaging device CAM1, the objects respectively formed on the lenses Lf, Lm and Ln of the multi image forming lens 33 are focused on the imaging surface of the imaging element 32 by the focal lens 34, and images of the objects are formed, thereby providing an imaging signal. As shown in an imaging area (PA) of the imaging element 32 of FIG. 4A, a central upper area (PAf) of the imaging surface is formed as a distant imaging area, which captures images of an object formed on the distant area lens Lf, a middle band area (Pam) of the imaging surface (excluding the distant imaging area PAf) is formed as a vicinity imaging area, which captures images of an object formed on the vicinity area lens Lm, and a peripheral area (Pan) of the imaging surface is formed as a near imaging area, which captures images of an object formed on the near area lens Ln. That is, since the vicinity area lens Lm is formed as a middle focal lens, a focal length of the vicinity area lens Lm is set to a so-called standard focal length. Hence the object imaged in the vicinity imaging area PAm has a standard size. Since the distant area lens Lf is formed as a long focal lens having a focal length longer than that of the vicinity area lens Lm, the object imaged in the distant imaging area PAf has a magnification larger than that of the standard size. Also, since the near area lens Ln is formed as a shot focal lens having a focal length shorter than that of the vicinity area lens Lm, the object imaged in the near imaging area PAn has a wider area than that of the standard size. FIG. 4A is a conceptual diagram illustrating the imaging area. The imaging area in which the upper and lower portions of the imaging element 32 are inverted may be used in accordance with the configuration of the focal lens 34.

Figure 4B:
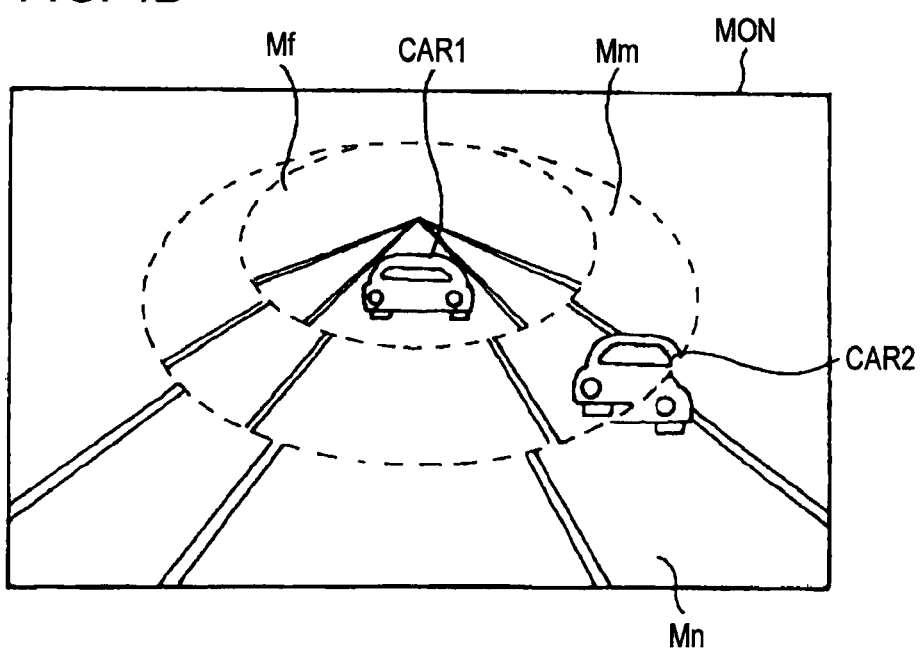
FIG. 4B is a conceptual diagram of an image imaged by the monitoring camera.

The image captured by the imaging device CAM1 is displayed on a monitoring device MON connected to the object detecting unit 21, as shown in FIG. 4B. Since a distant display area Mf close to the central upper portion of the display screen of the monitoring device MON is imaged by the far area lens Lf, an image of a subsequent vehicle CAR1 in the distant area Af behind the vehicle is captured as an image having a large magnification. Meanwhile, since an image of the vicinity display area Mn in the periphery of the display screen is captured by the near area lens Ln, an image of an object CAR2 in the near area An having a wide range and close to the side of the rear portion of the subject vehicle is captured. In addition, since an image of the vicinity display area Mm formed as the middle band area (excluding the peripheral near display area Mn and the distant display area Mf) is captured by the vicinity area lens Lm, an image of an object in the vicinity area Am slightly far from the near area An in rear of the vehicle is captured at the standard imaging magnification and the standard viewing angle. Further, in the example, the other adjacent vehicle CAR2 is present from the vicinity area Am to the near area An.

The imaging signal of the object imaged by the imaging device CAM1 is image-recognized by the object detecting unit 11, so that the objects respectively in the distant area Af, the vicinity area Am, and the near area An are detected. In some known techniques, the object in the distant area Af was imaged as a small image. However, since the distant imaging area PAf of the imaging element is able to obtain an image of the object in the distant area Af at a large imaging magnification by using the long focal far area lens Lf, the number of pixels of the imaging element 32 used to obtain an image of the object in the distant area increases. Hence, it is possible to detect the object through high resolution image recognition. On the other hand, in the near imaging area PAn from the vicinity imaging area PAm of the imaging element 32, since it is possible to obtain an image of an object at a wide viewing angle by using the lenses Lm and Ln having a standard focal length or a focal length shorter than the standard focal length, it is possible to detect an object in the side of the subject vehicle as well as an object behind the vehicle through the image recognition. At this time, since the object is in the vicinity of the vehicle, even when the object is imaged by the short focal lens, it is possible to obtain high resolution at which the object is imaged at a size sufficient for image recognition. Accordingly, it is possible to obtain an image of the objects in the periphery of the vehicle from the far area Af to the vicinity area Am or the near area An at a high resolution. As a result, it is possible to detect the object through the image recognition.

When the object detecting unit 11 detects the object so as to perform image recognition based on the image acquired by the imaging operation from the distant area Af to the near area An, the lighting control unit 12 controls a lighting operation of the rear lamp RL or the high mount stop lamp HMSL based on detection of the object. The lighting control unit 12 is configured to turn on the tail lamp of the rear lamp RL when the lamp switch is turned on by a driver, and to control a lighting operation of the stop lamp of the rear lamp RL and the high mount stop lamp HMSL when the brake pedal is operated by the driver. In addition, the lighting control unit 12 is configured to flicker a hazard lamp (e.g., a turn signal lamp) of the rear lamp RL when a hazard lamp switch is operated by the driver.

Figure 5:
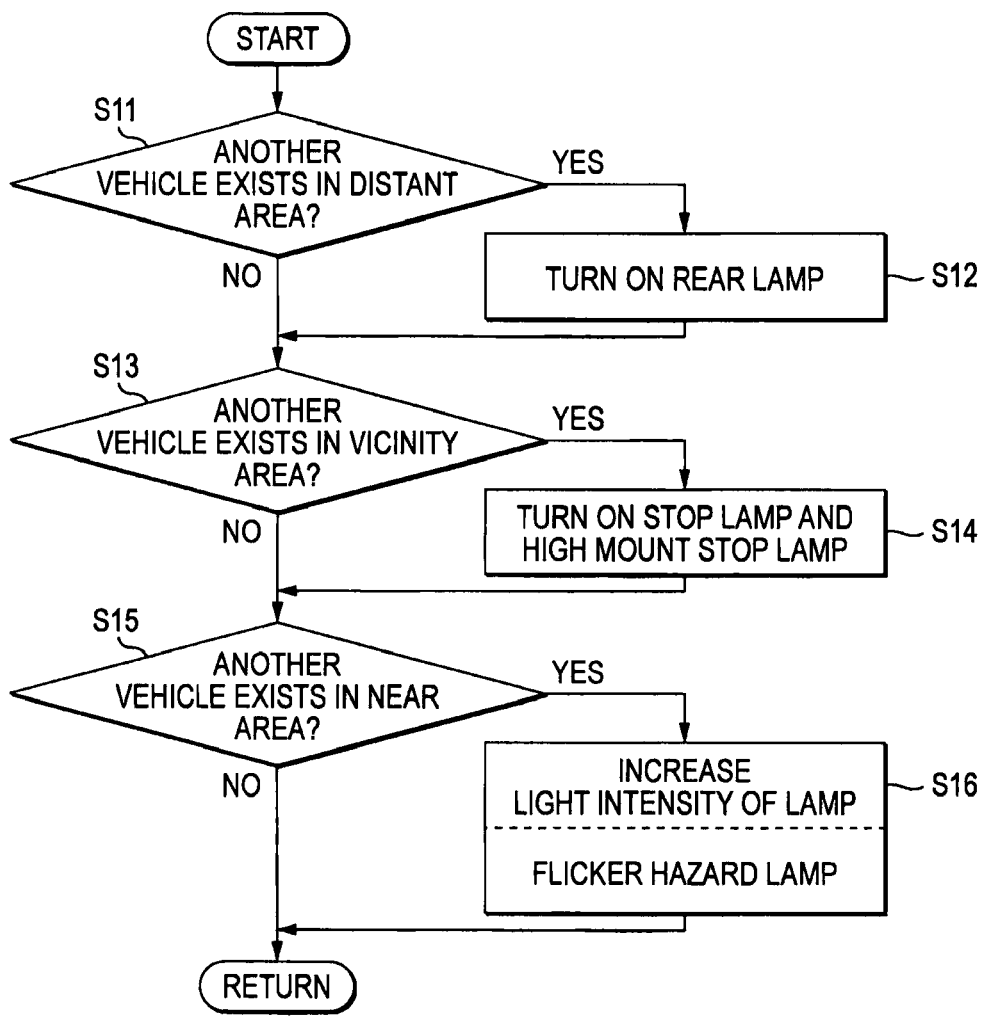
FIG. 5 is a flowchart illustrating an example of an operation of the monitoring camera.

When the object detecting unit 11 detects another vehicle based on the acquired image, the lighting control unit 12 automatically controls the lighting operation of the rear lamp RL or the high mount stop lamp HMSL. See, for example, FIG. 5, which is a flowchart illustrating an example of the lighting control. If the object detecting unit 11 detects another vehicle in the distant area Af when the rear lamp RL is not turned on in a high speed traveling mode (S11), the lighting control unit 12 controls turning on of the rear lamp RL (S12). Accordingly, it is possible easily to detect the presence of another vehicle in the distant area Af. The same applies to the case where another vehicle in the vicinity area Am is detected when the rear lamp RL is not turned on in a middle speed traveling mode.

If the object detecting unit 11 detects another vehicle in the vicinity area Am when the rear lamp RL is turned on in a high speed traveling mode or a middle speed traveling mode (S13), the lighting control unit 12 controls turning on of the stop lamp of the rear lamp RL or the high mount stop lamp HMSL (S14). Accordingly, it is possible more easily to detect the presence of another vehicle coming close to the vehicle. In addition, if the object detecting unit 11 detects another vehicle coming close to the near area An even after performing the above-described lighting control (S15), the lighting control unit 12 increases the light intensity of the stop lamp of the rear lamp RL or the high mount stop lamp HMSL (S16). Particularly, in detecting another vehicle in the near area An immediately after the vehicle in a high speed traveling mode, control operation is performed so as to increase the light intensity of the lamps and simultaneously flicker the hazard lamp of the rear lamp RL so as to provide an alarm to another vehicle coming close to the vehicle (S16). Likewise, when the lighting operation of the hazard lamp or the stop lamp of the rear lamp RL or the high mount stop lamp HMSL is controlled in accordance with the distance between the vehicle and another vehicle by detecting another vehicle located in the periphery of the vehicle and located anywhere from the distant area Af to the near area An based on the image acquired by the imaging device CAM1, it is possible to ensure safer traveling by increasing a recognition level of the vehicle with respect to another vehicle so as to prevent an accident.

According to the first embodiment, in the imaging device CAM1, an image of the object of the distant area Af is obtained by the multi image forming lens 33 at an enlarged size, and an image of the object in the wide range from the vicinity area Am to the near area An is obtained. Accordingly, based on the images acquired by the imaging device CAM1, it is possible to detect the object in the distant rear side, the near rear side, or the side of the vehicle in a high speed traveling mode, a middle speed traveling mode, or a low speed traveling mode at a high resolution without missing the object, and thus reliably to detect the object (e.g., another vehicle). Accordingly, it is possible to ensure safer traveling of the vehicle in such a manner that the presence of the vehicle is recognized by another vehicle through the lighting operation of the vehicle, or an alarm is provided to another vehicle.

Second Embodiment

Figure 6:
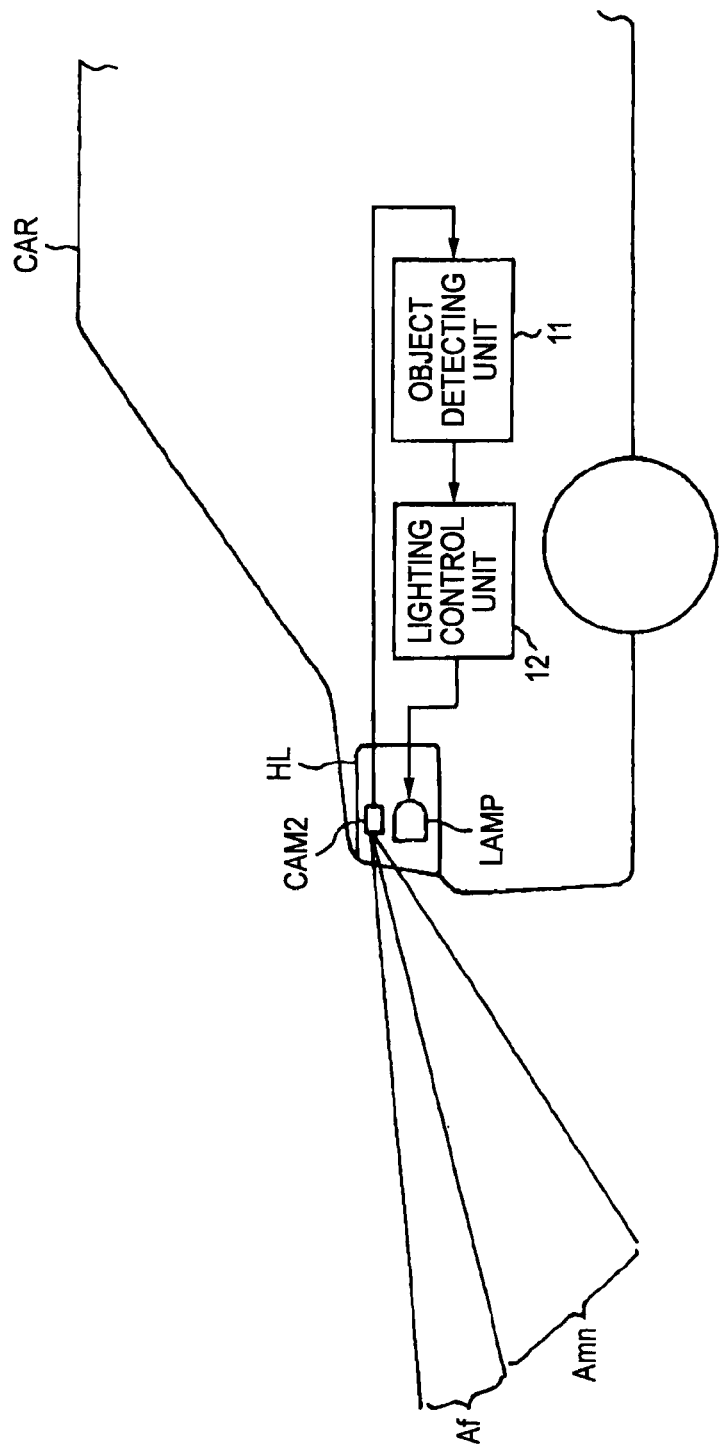
FIG. 6 is a schematic view of a monitoring camera according to a second embodiment of the invention.

FIG. 6 is a conceptual view of a monitoring camera system according to a second embodiment of the invention. In the second embodiment, a lamp LAMP such as a high beam lamp or a low beam lamp is disposed in any one of left and right head lamps HL in the front of the vehicle CAR. The lamp LAMP is disposed inside a housing of the right head lamp together with an imaging device CAM2 as a monitoring camera, so as to image an area in the front or side of the vehicle. The object detecting unit 11 has the same configuration as that of the first embodiment, and detects another vehicle by performing an image analysis on the object acquired by the imaging device CAM2. In addition, the lighting control unit 12 is configured to control the lighting state of the left and right head lamps HL provided in the vehicle based on the object detected by the object detecting unit 11.

Figure 7A:
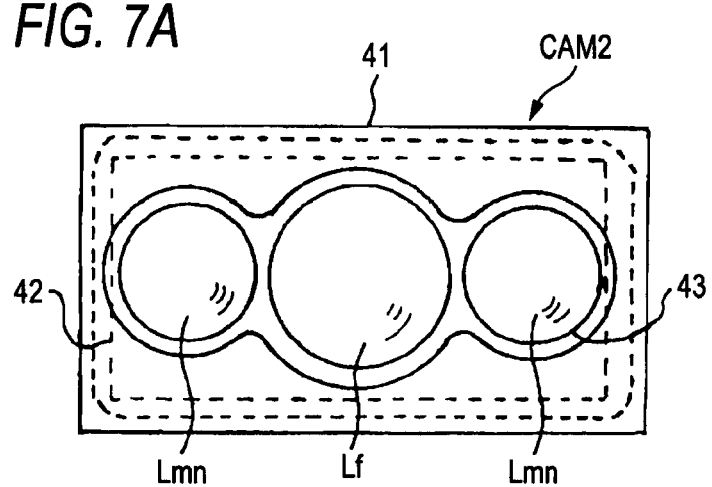
FIG. 7A is a front view of the monitoring camera according to the second embodiment.
Figure 7B:
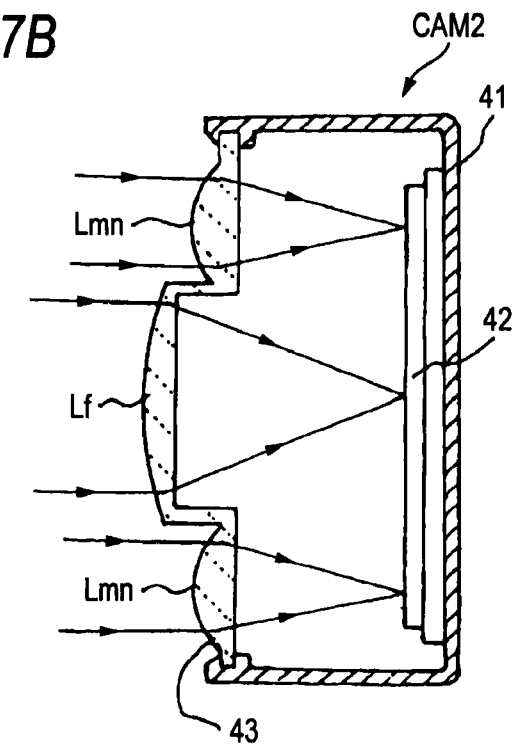
FIG. 7B is a horizontal sectional view of the monitoring camera according to the second embodiment.

The imaging device CAM2 is configured to obtain an image of each of two areas, that is, a distant area Af and a vicinity/near area Amn in front of the vehicle CAR, as shown in FIG. 6. FIG. 7A is a front view of the imaging device CAM2, and FIG. 7B is a horizontal sectional view thereof. The imaging device CAM2 includes an imaging element 42 and a multi image forming lens 43 in the inside of a camera body 41 formed in a rectangular box shape. The multi image forming lens 43 includes a distant area lens Lf, which is formed as one long focal lens, and a vicinity/near area lens Lmn, which is formed as two short focal lenses. The distant area lens Lf is disposed at the center, and the two vicinity/near area lenses Lmn are disposed on the left and right sides thereof. In addition, the far area lens Lf is disposed closer to the forward position than the vicinity/near lens Lmn.

Figure 8A:
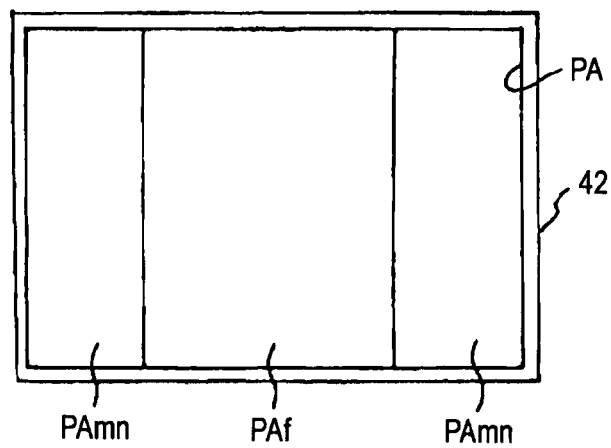
FIG. 8A is a conceptual diagram of an imaging area of the monitoring camera according to the second embodiment.

In the imaging device CAM2 according to the second embodiment, as shown in FIG. 8A, the object formed on the distant area lens Lf of the imaging element 42 is displayed in the distant imaging area PAf divided at the center in the transverse direction of the imaging area PA. The objects formed on the two vicinity/near area lenses Lmn are respectively imaged in the vicinity/near imaging areas PAmn on both left and right sides of the imaging element 42. Since the distant area lens Lf is formed as the long focal lens, the distant object is imaged at a large magnification in the distant imaging area PAf of the imaging element 42. On the other hand, since the vicinity/near area lens Lmn is formed as the short focal lens, the object present over a wide range is imaged in the vicinity/near area PAmn of the imaging element 42.

Figure 8B:
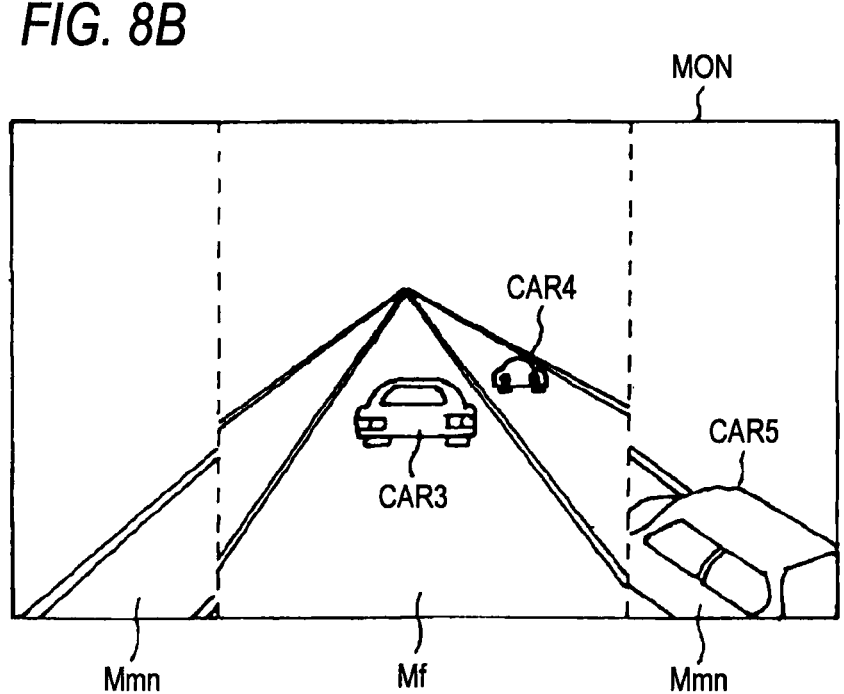
FIG. 8B is a conceptual diagram of an image imaged by the monitoring camera according to the second embodiment.

Assuming that the image acquired by the imaging device CAM2 is displayed on the monitoring device, as shown in FIG. 8B, since the image of the distant display area Mf of the display screen of the monitoring device MON is obtained by the distant area lens Lf, an image of an object such as a preceding vehicle CAR3 or an oncoming vehicle CAR4 in the distant area Af in front of the vehicle is obtained at a large imaging magnification. On the other hand, since the vicinity/near display area Mmn of the display screen is imaged by the vicinity/near area lens Lmn, the object over a wide range from a front side of the vehicle to the side or vicinity thereof is imaged, so that another vehicle CAR5 in the near side is imaged.

The imaging signal of the object acquired by the imaging device CAM2 is image-recognized by the object detecting unit 11, so that the objects present respectively in the distant area Af and the vicinity/near area Amn are detected. In some known techniques, the object in the distant area Af was imaged as a small image. However, since the distant imaging area PAf of the imaging element 42 is able to capture the image of the object in the distant area Af at a large imaging magnification, it is possible to detect the distant object through the high resolution image recognition. On the other hand, in the vicinity/near imaging area PAmn of both sides of the imaging element 42, it is possible to detect the object over a wide area from the front side of the vehicle to the side thereof through image recognition.

Figure 9:
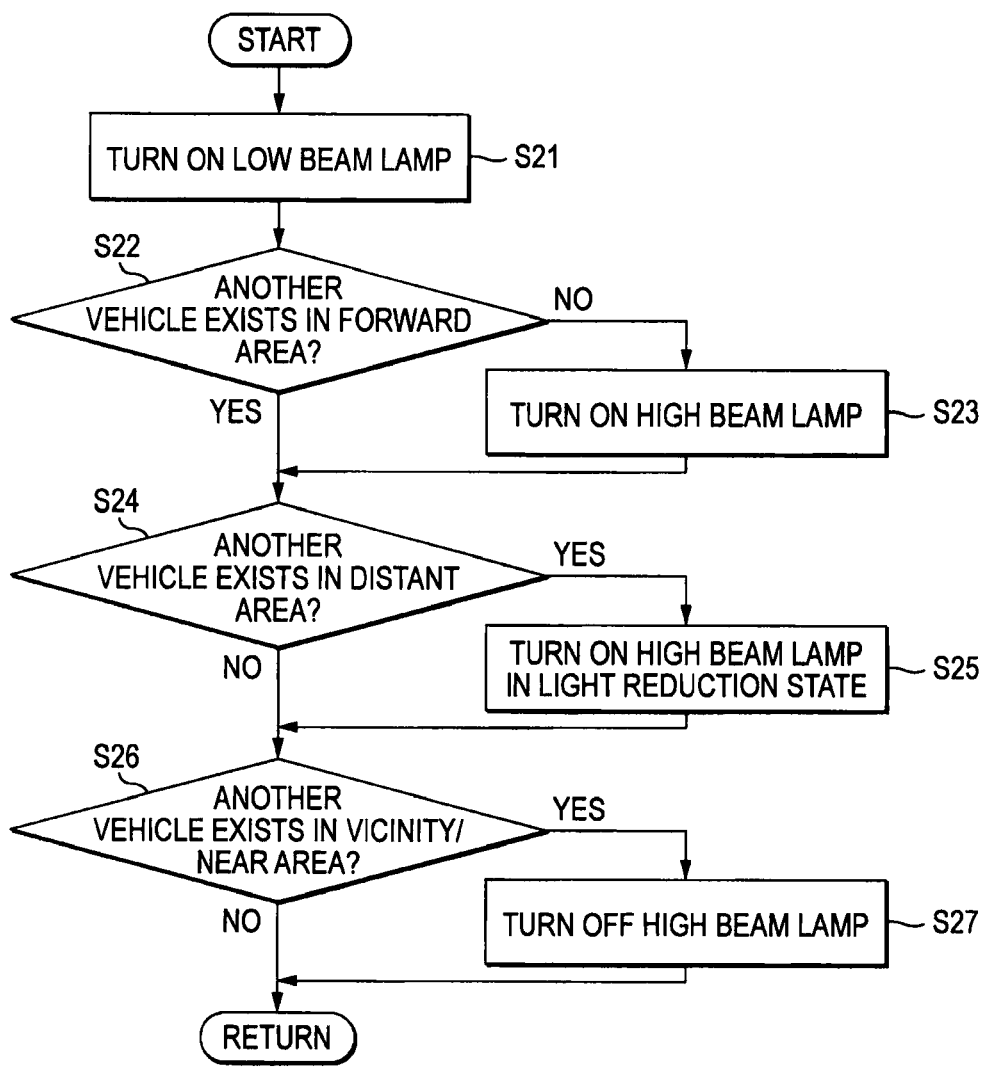
FIG. 9 is a flowchart illustrating an example of an operation of a monitoring camera system according to the second embodiment.

Likewise, the object detecting unit 11 detects the object by performing the image recognition based on the image obtained from the distant area Af to the vicinity/near area Amn. The lighting control unit 12 controls a lighting operation of the low beam lamp or the high beam lamp of the left and right head lamps HL of the vehicle when the lamp switch is turned on by the driver. In addition, for example, as shown in the lighting control flowchart of FIG. 9, when the low beam lamp is turned on and the high beam lamp is not turned on (S21), and when the object detecting unit 11 cannot detect another vehicle in the distant area Af and the vicinity/near area Amn of the vehicle CAR (S22), the lighting control unit 12 performs a control operation to turn on the high beam lamp (S23). Accordingly, it is possible to ensure traveling safety of the vehicle by illuminating a forward area of the vehicle over a wide range up to the distant area Af.

On the other hand, when the object detecting unit 11 detects another vehicle in the distant area (S24), the lighting control unit 12 performs a control operation to decrease the light intensity of the high beam lamp (S25). Accordingly, it is possible to maximize illumination over a wide range in front of the vehicle without producing glare to the oncoming vehicle or the preceding vehicle in the distant area Af. On the other hand, if the object detecting unit 11 detects another vehicle in the vicinity/near area Amn when the high beam lamp is turned on (S26), the lighting control unit 12 performs a control operation to f turn off the high beam lamp (S27). Accordingly, it is possible to prevent causing glare to the oncoming vehicle or the preceding vehicle.

According to the second embodiment, in the imaging device CAM2, the object in the distant area Af is enlarged and imaged by the multi image forming lens 43, the object present over a wide range of the vicinity/near area Amn is imaged, and then the object in the distant front side, the near front side, or the side of the vehicle is imaged at a high resolution, thereby reliably detecting the object through image recognition. Accordingly, it is possible to ensure safer traveling of the vehicle by preventing (or reducing) glare to the other detected vehicle by the lighting operation of the lamp of the vehicle.

In the first and second embodiments, all images acquired by the imaging element are displayed simultaneously on the monitoring device, or the object is detected through the image recognition, but the object detecting unit can be configured to detect the object by extracting the imaging signal of only a part of all pixels of the imaging element. For example, in the first embodiment, the imaging signal can be extracted from only the distant imaging area PAf of the entire imaging area PA of the imaging element 32, only the image of the distant area Af is acquired, and only the object in the far area Af is detected. The same applies to the vicinity imaging area PAm or the near imaging area PAn. Likewise, when the independent imaging operation is performed for each area, it is possible to detect more precisely the position or state of the object.

In the first embodiment, the lighting state of the rear lamp of the vehicle is controlled by detecting another vehicle in an area behind the vehicle. In the second embodiment, the lighting state of the head lamp of the vehicle is controlled by detecting another vehicle in an area in front of the vehicle. Both the configuration of the first embodiment and the configuration of the second embodiment can be provided in the vehicle. In addition, in the first embodiment, the imaging device is provided in the high mount stop lamp, and in the second embodiment, the imaging device is provided in the head lamp. In some cases, the imaging device is disposed in both the rear portion and the front portion of the vehicle independently of the lamp. In the case where the imaging device is provided in the lamp, if the imaging optical axis is aligned to the lamp optical axis when the imaging device is provided in the lamp, it is not necessary to perform optical axis adjustment of the imaging optical axis just by performing optical axis adjustment of the lamp optical axis. In addition, in the case where the imaging device is provided in the lamp, the lamp is not limited to the high mount stop lamp or the head lamp of the first embodiment.

Further, in the first and second embodiments, as an example, the image forming lens can be a multi image forming lens integrally formed with multiple lenses having different focal lengths. However, the image forming lens also can be formed as multiple independent lenses. In addition, each area of the imaging surface of the imaging element, that is, the distant imaging area, the vicinity imaging area, the near imaging area, and the vicinity/near imaging area are not limited to the particular shape of the first and second embodiments, but may be set to an arbitrary shape. Further, the acquired image can be displayed on a monitoring device, or can be displayed on a navigation screen of a navigation system as the monitoring device.

Embodiments of the invention can be applied to a monitoring camera which detects an object existing from a distant area to a near area of a vehicle using an imaging device. In addition, embodiments of the invention may be applied to a vehicle monitoring camera system that detects an object based on an image acquired by an imaging device and controls a lighting state of a vehicle based on the detected object.

Although the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A monitoring camera for a vehicle that images a distant area, a vicinity area and a near area in front of or behind the vehicle, the areas being different from one another, the monitoring camera comprising:
   an imaging element;
   an image forming lens comprising a plurality of lenses each having a different focal length, and
   a detector; and
   a lighting controller;
   wherein the monitoring camera is configured so that each image of an object passing through a different one of the lenses is formed on a corresponding different region of an imaging surface of the imaging element;
   wherein the detector is configured to detect objects in front of or behind the vehicle based on an imaging signal extracted from only a subset of all pixels of the imaging surface and to identify the distant area, the vicinity area or the near area as an area in which the object is located based on a correspondence between the subset of pixels of the imaging surface and a particular one of the distant area, the vicinity area or the near area; and
   wherein the lighting controller controls a lighting state of a vehicle lamp based on the identified area where the object is located.

2. The monitoring camera according to claim 1, wherein the image forming lens comprises:
   a first lens having a first focal length to obtain an image of the distant area in front of or behind the vehicle; and
   a second lens having a second focal length to obtain an image of the vicinity area or the near area in front of or behind the vehicle, wherein the second focal length is shorter than the first focal length.

3. The monitoring camera according to claim 2, wherein the monitoring camera is mounted in a vehicle lamp.

4. The monitoring camera of claim 1, wherein the subset of pixels is pre-determined.

5. The monitoring camera of claim 1, wherein the detector is also configured to detect objects in front of or behind the vehicle based on a second imaging signal extracted from only a second subset of all pixels of the imaging surface, where the second subset does not include any pixels of the first subset.

6. The monitoring camera according to claim 1, wherein the lighting controller controls the lighting state of the vehicle lamp so as to reduce glare on the object caused by light from the vehicle lamp.

7. A monitoring camera system comprising:
   a monitoring camera for a vehicle that images a distant area, a vicinity area and a near area in front of or behind the vehicle, the areas being different from one another, the monitoring camera comprising:
      an imaging element; and
      an image forming lens comprising a plurality of lenses each having a different focal length,
      wherein the monitoring camera is configured so that each image of an object passing through a different one of the lenses is formed on a corresponding different region of an imaging surface of the imaging element,
   the monitoring camera system further comprising:
   a detector configured to extract an imaging signal from only a part of all pixels of the imaging surface, configured to detect objects in front of or behind the vehicle based on the extracted imaging signal, and configured to identify the distant area, the vicinity area or the near area as an area in which the object is located based on a correspondence between the part of the pixels and a particular one of the distant area, the vicinity area or the near area; and
   a lighting controller to control a lighting state of a vehicle lamp based on the identified area where the object is located.

8. The system of claim 7, wherein the part of pixels is pre-determined.

9. The system of claim 7, wherein the detector is also configured to extract a second imaging signal from only a second part of all pixels of the imaging surface, and configured to detect objects in front of or behind the vehicle based on the second extracted imaging signal, wherein the second part does not include any pixels of the first part.

10. The system according to claim 7, wherein the lighting controller controls the lighting state of the vehicle lamp so as to reduce glare on the object caused by light from the vehicle lamp.

* * * * *